UNITED STATES PATENT OFFICE.

GADIENT ENGI AND JAROSLAV FRÖHLICH, OF BASEL, SWITZERLAND, ASSIGNORS TO SOCIETY OF CHEMICAL INDUSTRY IN BASLE, OF BASEL, SWITZERLAND.

ORANGE VAT DYESTUFFS AND PROCESS OF MAKING SAME.

1,081,898. Specification of Letters Patent. Patented Dec. 16, 1913.

No Drawing. Application filed October 19, 1911. Serial No. 655,498.

*To all whom it may concern:*

Be it known that we, GADIENT ENGI, doctor of philosophy and chemist, a citizen of the Swiss Republic, and resident of Basel, Switzerland, and JAROSLAV FRÖHLICH, doctor of philosophy and chemist, a subject of the Emperor of Austria-Hungary, and resident of Basel, Switzerland, have invented new and useful Orange Vat Dyestuffs and a Process of Making Same, of which the following is a full, clear, and exact specification.

We have found, that valuable new orange dyestuffs are obtained, by acting with a halogenating agent on the condensation product of an acenaphthenequinone compound with an amino-oxythionaphthene. In the preparation of the said condensation product the aminooxythionaphthene may be produced in the reaction mass itself by heating the corresponding amino-oxy-thionaphthene-carboxylic acid with the acenaphthene-quinone compound. The dyestuffs thus obtained dye cotton and wool in an alkaline vat orange to brownish orange shades. They form in dry state brownish yellow to brown powders insoluble in water, but dissolving in concentrated sulfuric acid with a blue color.

The invention is illustrated by the following examples, the parts being by weight.

Example I: In a mixture of 80 parts of sulfuric acid of 97 per cent. and 7 parts of bromin, cooled to 0° C. are introduced while stirring 3,4 parts of the product resulting from the condensation of acenaphthenequinone of the structural formula

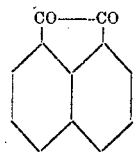

with 6-amino-3-oxy-1-thionaphthene of the structural formula

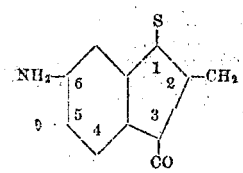

in alcohol the said condensation product corresponding to the structural formula

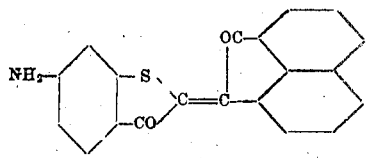

The temperature is then raised in the course of 4 to 5 hours to 20-25° and the mixture is stirred at this temperature for about 10 hours. The mass is then poured into water, the whole filtered and the solid matter washed until the washings are neutral. The dried dyestuff constitutes a brown powder dissolving in concentrated sulfuric acid with a blue color. In an alkaline vat it dyes cotton and wool vivid orange tints.

Example II: 3,7 parts of the product resulting from the condensation of the 6-amino-3-oxy-1-thionaphthene-carboxylic acid corresponding to the formula

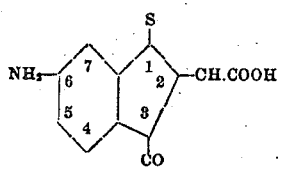

with acenaphthene-quinone in acetic anhydrid are suspended in 35 to 40 parts of nitrobenzene and into this mixture are introduced 7 parts of bromin, the mixture being hereafter stirred for 12 hours at the ordinary temperature. The mass is then heated for 1 to 2 hours at 200-220° C., cooled down and filtered in order to separate the brominated product. The new dyestuff is obtained in form of a brownish yellow powder dissolving in concentrated sulfuric acid with a greenish blue color. In an alkaline vat it dyes animal and vegetable fibers brownish orange.

In an analogous manner dyestuffs are obtained when the condensation products derived from the substitution products of acenaphthene-quinone, as for instance chloracenaphthene-quinone, bromacenaphthene-quinone, amino-acenaphthene-quinone, are employed as parent material.

Instead of the diluents used in the exam ples, other suitable solvents or diluents may be used, such as for example chlorosulfonic acid and sulfuryl chlorid. The bromination can also be effected directly with liquid bromin without employ of a diluent. Finally chlorin may be employed as halogenating agent.

What we claim is:

1. The herein described process for the manufacture of orange vat dyestuffs, which consists in acting with a halogenating agent on a condensation product obtainable by condensing an acenaphthene-quinone compound with an amino-oxythionaphthene.

2. The herein described process for the manufacture of orange vat dyestuffs consisting in acting with a halogenating agent on a condensation product obtainable by heating an acenaphthene-quinone compound with an amino-oxythionaphthene-carboxylic acid, this latter being intermediately transformed into the corresponding amino-oxythionaphthene which reacts upon the acenaphthene-quinone compound.

3. The herein described process for the manufacture of orange vat dyestuffs by treating with bromin the condensation products obtainable by condensing acenaphthene-quinone with an amino-oxythionaphthene.

4. The herein described process for the manufacture of orange vat dyestuffs by treating with bromin the condensation products obtainable by heating acenaphthene-quinone with an amino-oxythionaphthene-carboxylic acid, this latter being intermediately transformed into the corresponding amino-oxythionaphthene which reacts upon the acenaphthene-quinone compound.

5. As new products the orange vat dyestuffs obtainable by acting with a halogenating agent on a condensation product derived from an acenaphthene-quinone compound and 6-amino-oxythionaphthene, the said vat dyestuffs forming in dry state brownish yellow to brown powders insoluble in water, dissolving in concentrated sulfuric acid with a blue color and dyeing vegetable and animal fibers in an alkaline vat orange to brownish orange shades.

6. As new products the orange vat dyestuffs obtainable by acting with bromin on the condensation products corresponding to the formula

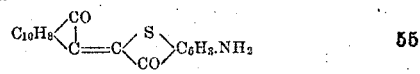

derived from acenaphthene-quinone and 6-amino-oxythionaphthene, forming in dry state brown to brownish yellow powders insoluble in water, dissolving in concentrated sulfuric acid with a blue color and yielding with alkaline reducing agents violetish brown vats dyeing vegetable and animal fibers orange shades.

In witness whereof we have hereunto signed our names this 7th day of October 1911, in the presence of two subscribing witnesses.

GADIENT ENGI.
JAROSLAV FRÖHLICH.

Witnesses:
GEORGE GIFFORD,
AMAND BRAUN.